Oct. 16, 1962 R. B. SQUIRES 3,058,660
TRANSMISSION COST COMPUTER
Filed May 7, 1958
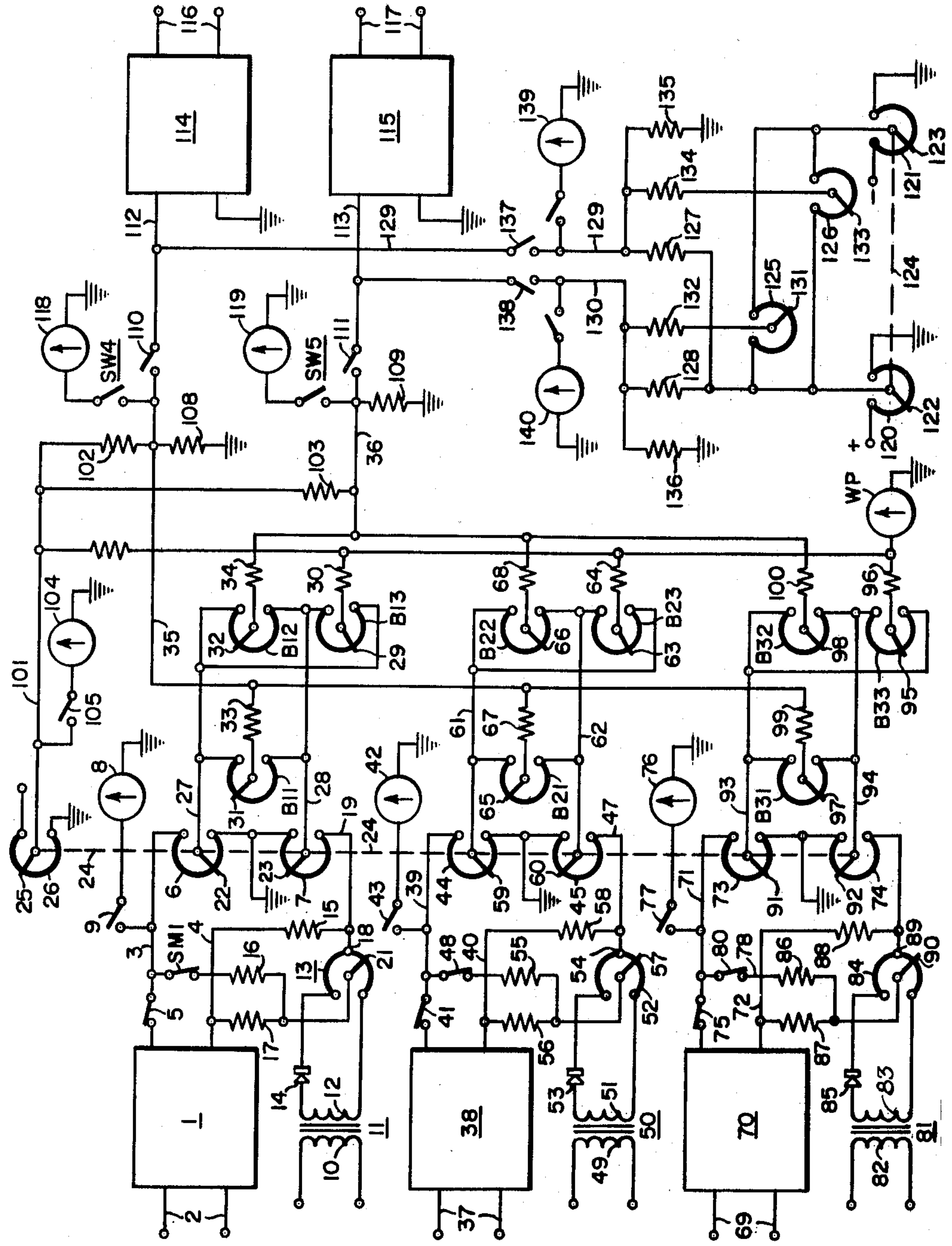
WITNESSES
Edwin E. Bassler
James F. Young
INVENTOR
Rathbun B. Squires
BY
George C. Thompson Jr.
ATTORNEY United States Patent Office 3,058,660 Patented Oct. 16, 1962

3,058,660
TRANSMISSION COST COMPUTER
Rathbun B. Squires, Forest Hills, Pa., assignor to Westinghouse Electric Corporation, East Pittsburgh, Pa., a corporation of Pennsylvania
Filed May 7, 1958, Ser. No. 733,516
6 Claims. (Cl. 235—185)

This invention relates to a transmission cost computer, and more particularly, to a computer capable of computing incremental station power production cost for each individual generating station of the electrical power system, taking into consideration the transmission losses of the system.

The assignment of total generation among the individual generators of a power system is usually done on the basis of equal incremental cost of power at the station bus bars, and this cost will be called "bus bar cost." If transmission losses are significant the assignment should be made on the basis of equal incremental cost of delivered power. The latter quantity, usually called "lambda," is equal to "bus bar costs" plus the "cost of the incremental transmission losses," that result from a small increment of power at a given station. We can call the latter quantity "transmission cost."

Because system losses are charged at the lambda rate, each station has an equation associated with it of the following form:

Bus bar cost+lambda×(transmission losses)=lambda where:

Bus bar cost is the incremental cost of power at the station bus bars, and is usually given in units of dollars per megawatt-hour;

Lambda×(transmission losses) is the transmission cost, i.e. the cost of the incremental "transmission losses," with lambda being the incremental cost of delivered power in units of dollars per megawatt-hour; and Transmission losses being the change in the total transmission power losses for a change in the power generated at a given station, and is a dimensionless quantity, for example, of megawatts per megawatts.

In the Economic Dispatch Computer, first described in the application of E. L. Harder, Serial No. 556,149, entitled "Analog Computer," filed December 29, 1955 and assigned to the common assignee, all the terms in these equations are represented. The relation between bus bar cost and station power is represented by voltages on non-linear potentiometer which are on a shaft whose rotation is proportional to station power. The same shaft has other potentiometers which energize the elements representing the B coefficient loss matrix with a voltage proportional to $\pm\lambda P$. The voltage output of the loss matrix represents transmission cost and is applied to the input of a summing amplifier along with voltages proportional to lambda and bus bar cost. The output of the amplifier drives the servo-motor which turns the potentiometer shaft until the equation listed previously is satisfied.

The transmission cost computer is an analog device for determining the distribution of generation among the stations of a power system, so that the delivered power cost is the same from all generating stations. When this condition exists, the cost of delivering power to the system is a minimum. Equal delivered power cost for every station, means that the next increment of power supplied by the system could be supplied from any station and still have the system operating in the most economic manner. Delivered power cost is equal to the Bus Bar cost at the station plus transmission cost. The following equation expresses the conditions necessary for economic dispatch of a system:

Bust bar cost+transmission cost=delivered power cost (lambda)

Delivered power cost is referred to as "lambda." In the equations of economic dispatch for a system, transmission losses are charged at the value of "lambda." Therefore, we can say that:

Lambda−lambda×(transmission losses)=bus car cost

The computer solves the above equation and sends to each station a signal representing bus bar cost.

The transmission losses are determined by use of the following relationship:

$$\text{Transmission losses} = P_1B_{11}+P_2B_{21}+P_3B_{31}+ \dots +P_NB_{N1}$$

where N is equal to the number of stations and ties on the system, and B represents the transmission impedance.

It is therefore an object of this invention to provide a transmission loss computer capable of continuously metering the station power output and system cost of delivered power for producing a continuous control signal to each station of the system corrected for the cost of transmission losses.

It is another object of this invention to provide supplemental power input controls to be added to the station power output indicated as existing at the station by metering equipment, for providing corrective control during periods of malfunction of the telemetering equipment.

It is another object of this invention to provide visual indication of station and tie power as well as incremental production costs being supplied to the station from the transmission cost computer, and the incremental cost of power at tie line interconnection points.

It is still another object of this invention to provide a manual supplement for the telemetering input signal to the computer for each station that is capable of providing a supplemental signal that does not affect the telemetering signal.

It is another object of this invention to provide an auxiliary transmission loss computer capable of being adjusted to known transmission production cost levels during periods when the transmission loss computer is inoperative or used for future transmission loss problems.

Other objects, purposes and characteristic features will become obvious as the description of the invention progresses.

In practicing this invention, there is provided an input telemetering signal from each of the system stations and tie-lines capable of producing voltages that are modified by a system incremental cost of delivered power and applied to a transmission loss resistance matrix. The output of the matrix is then combined with a voltage representing the system incremental cost of delivered power having the opposite sign to produce an incremental cost of power production for each station in the system which is then transmitted to the station by telemetering equipment. The input telemetering equipment establishing station power voltages is also provided with a supplemental manual input capable of being used during failure of the telemetering equipment or to supplement the telemetering equipment in developing individual station power voltages. During times of computer malfunction, there is provided a auxiliary transmission loss computer capable of being adjusted manually to known station incremental production cost levels for each station in the system to provide an approximate transmission loss function for the system associated with this computer during periods of breakdown, or when the computer is being used to represent future conditions.

The FIGURE of the drawing is a schematic view of one embodiment of this invention capable of providing a transmission lost cost function to each of the stations for control purposes.

The computer shown is of the type that is used with a transmission system loading control such as the loading control system shown in the Brown et al. U.S. Patent No. 2,888,575, issued May 26, 1959 and entitled "Automatic Dispatching System" and assigned to the common assignee. The computer receives signals from the stations of the system such as shown in the aforementioned automatic dispatching system over telemetering channels with the telemetering equipment presenting station power voltages for each station above and below ground potential. For example, a telemetering equipment 1, receiving a signal over the conductors 2 from a station STA1 (not shown), provides an output voltage on the conductors 3 and 4, over the now closed switch 5. The voltage on the conductor 3 would be above ground potential or positive with respect to ground by an amount equivalent to station STA1 power output. The voltage on the conductor 4 would be negative with respect to ground by a voltage equal to station power output of station STA1. The method of developing the plus and minus voltages is shown in detail in the above mentioned U.S. patent. The voltages of the conductors 3 and 4 are applied across the lambda following potentiometers 6 and 7 connected in series and grounded at the midpoint therebetween.

In order to read the amount of power indicated as being delivered by station STA1, a volt meter 8 calibrated in power is connected to the conductor 3 through a manually controlled switch contact 9, with the other terminal of the meter 8 connected to ground. The volt meter reading would therefore vary as the voltage of the conductor 3 rises and falls in response to power being delivered from station STA1, into the system with which station STA1 is associated. In addition to voltage being developed by the telemetering equipment 1 which is applied to the conductors 3 and 4, there is provided a manually controlled voltage input control for supplementing the telemetering signal as is necessary. The input voltage is acquired from a suitable source of alternating current power (not shown) by the primary 10 of a transformer 11 provided with a secondary 12 connected across the input terminals of a potentiometer 13 through a rectifier 14. The voltage being applied to the potentiometer 13 is therefore a unidirectional voltage to be added over the resistance network associated therewith to the conductors 3 and 4 associated with station STA1. In order to apply the voltage from transformer 11 to the conductors 3 and 4 without affecting the output of the telemetering receiver 1, there is provided a resistor 15 of relatively low resistance placed in series in the conductor 4 and adjacent to the lambda follower potentiometer 7. Connected across the conductors 3 and 4 in a series connection through a switch SM1 are a pair of resistors 16 and 17 of relatively high resistance value.

In order to provide both positive and negative power voltages as required, the potentiometer 13 is center tapped at 18 and connected to the conductor 4 through the resistor 15 and is also connected to the lambda follower potentiometer 7 through lead 18. With a reference point established at 18 on the potentiometer 13, it is only necessary to provide an electrical connection as shown between the potentiometer 13 through the movable contact 21 to a point midway between the resistances 16 and 17. By positioning the potentiometer movable arm 21 above or below the reference point 18 on the potentiometer 13 a signal voltage either positive or negative, respectively, can therefore be applied across the lambda potentiometers 6 and 7 and appear as a combined potential to the telemetering signal if desired without affecting the telemetering signal directly. The input from potentiometer 13 does not affect the telemetering because the potential from wire 3 to wire 19 which is produced by current from resistor 16 is exactly balanced by an opposite potential across resistor 15 which is produced by current from resistor 17. This voltage is received through the resistance network and therefore algebraically added to the telemetering signal when both are present at the potentiometers 6 and 7. The potentiometers 6 and 7 are provided with movable contacts 22 and 23, respectively, capable of being driven in opposite directions as shown in the drawings by a mechanical linkage 24 connected to the movable control arm 25 of a system lambda control potentiometer 26. The output of the movable members 22 and 23 is then applied to the conductors 27 and 28, respectively, feeding into a transmission loss resistor matrix. The matrix for example, comprises a transmission loss potentiometer as B11, connected across the conductors 27 and 28, for each station in the system. For example, the potentiometers B11 and B12 and B13 connected across the conductors 27 and 28 represent the component of loss cost caused by the power from station STA1 in the total transmission loss network. The movable members 31 and 32 of the potentiometers B11 and B12 respectively are connected through summing resistors 33 and 34, respectively to the transmission loss matrix output conductors 35 and 36, respectively. The movable member 29 of the potentiometer B13 is connected through the summing resistor 30 to the tie line worth of power reading meter WP.

Transmission loss cost for station STA2 delivered power is also considered by using a signal proportional to the station power which is received over the conductors 37 feeding into the telemetering equipment 38 capable of producing plus and minus voltages on the conductors 39 and 40 in the manner described hereinbefore. The voltages are applied to the conductors 39 and 40 through the switch 41 with the power being indicated on the meter 42 connected to the conductors 39 through the switch 43. Conductors 39 and 40 are connected across the lambda follower potentiometers 44 and 45 connected in series and grounded at a point midway therebetween.

In addition to the telemetering power signals being received over the telemetering equipment 38 a manual control signal can be applied to the conductors 39 and 40 over the conductors 46 and 47 connected thereto by the manually controlled switch 48. The manual signal is received from a source of power (not shown) over the primary winding 49 of a transformer 50 having a secondary winding 51 connected across the potentiometer 52 through a rectifier 53. The potentiometer 52 is center-tapped at 54 and connected to the conductor 40 through resistor 58 and through the conductor 47 to the lambda follower resistor 45. Connected across the conductors 39 and 40 is a pair of resistors 55 and 56 series-connected through switch 48 to the conductors 39 and 40. The midpoint between the resistors 55 and 56 is connected to the movable control arm 57 of the manual potentiometer 52. The conductor 40 is provided with a series resistance 58 of relatively low resistance value connected between conductors 40 and 47, as shown, to help provide an isolating resistance network capable of preventing interaction between the manual control and the telemetering equipment.

The lambda follower potentiometers 44 and 45 are provided with movable taps 59 and 60 connected to the mechanical link 24 to be driven in opposite directions from one extreme position to the other by the system lambda control. The output voltages of the taps 59 and 60 are delivered over the conductors 61 and 62, respectively, to potentiometers B21 and B22, and B23. Potentiometers B21 and B22 are given settings so that the current through resistors 67 and 68 respectively, represent the component of transmission loss cost caused by the power from station STA2 in the total transmission cost assignable to stations STA1 and STA2, respectively. The potentiometers B21 and B22 settings are provided through movable taps 65 and 66, respectively, connected through the summing resistors 67 and 68, respectively, to the transmission loss matrix output conductors 35 and 36 respectively. Potentiometer B23 has a movable tap 63 connected through a summing resistor 64 to the tie line worth of power volt meter WP to establish what effects the station STA2 power delivery to the system has on the tie line worth of power.

In addition to the components of transmission loss cost caused by station power, there is also a component of transmission loss cost caused by power flowing over tie lines between this system and any other adjacent system. The tie line power is metered and a proportional control signal is sent over the conductors 69 to the telemetering receiving equipment 70 capable of providing plus and minus power voltages for the tie line on the conductors 71 and 72, respectively. The conductors 71 and 72 are connected across the lambda follower potentiometers 73 and 74 connected in series and grounded at the midpoint therebetween. The circuit for the conductors 71 and 72 is completed over a switch 75. The power being delivered or received over the tie line associated with the input conductor 69 can then be read off of the voltmeter 76, calibrated in power, connected to the conductor 71 through the switch 77. In addition to the telemetering signal a manually controlled supplemental signal is provided to the plus and minus power conductors 71 and 72. The manual control supply is similar to the two previously described systems providing an input through transformer 81 having its primary 82 connected across a suitable source of power and its secondary 83 connected across a potentiometer 84 through a rectifier 85. The conductors 71 and 72 have connected thereacross in a series connection, through switch 80 and conductor 78, resistances 86 and 87 with the resistor 87 connection to the conductor 72 being separated from the lambda follower potentiometer 74 by a suitable resistor 88 of relatively low resistance value. In order to provide both positive and negative voltages as a supplement to the telemetering signal, the potentiometer 84 is center-tapped as at 89 and connected to a point between the resistor 88 and the lambda follower potentiometer 74. Adjustment of the manually controlled voltage is provided through adjustable tap 90 and the potentiometer 84 connected to a point midway between the resistors 86 and 87.

The lambda follower potentiometers 73 and 74 are provided with movable taps 91 and 92, respectively, moved in opposite directions between their extreme positions by the mechanical link 24 controlled by the system lambda control. Outputs of the movable taps 91 and 92 are fed over the conductors 93 and 94 respectively, to the transmission loss matrix potentiometers B31, B32 and B33 connected in parallel. The potentiometers B31 and B32 represent the component of transmission loss cost for stations STA1 and STA2 due to the tie line power flowing in the system. Potentiometer B33 is provided with a movable tap connected through a summing resistor 96 to the tie line worth of power meter WP to establish what effects tie line power flow in the system has on tie line worth of power. The potentiometers B31 and B32 are provided with movable taps 97 and 98 respectively connected through suitable summing resistors 99 and 100, respectively, to the output conductors 35 and 36, respectively.

The current appearing on the conductors 35 and 36 is the sum of the currents from the lambda following potentiometers which are fed through the transmission loss resistors and modified by the system lambda potentiometer. In order to produce the incremental production cost signal necessary to control each of the stations, it is necessary to provide an additional lambda value in the output. This is achieved by providing an output voltage, from the previously mentioned movable tap 25 of the system lambda control, over the conductor 101 to the summing resistors 102 and 103 connected between the conductor 101 and the transmission loss cost conductors 35 and 36, respectively. The system lambda value can be indicated by suitable volt meter 104 connected between ground and the system lambda conductor 101 over a suitable switch contact 105. The output current of the lambda control movable tap 25 is therefore combined with the output currents in the conductors 35 and 36 from the transmission loss matrix and flow through resistors 108 and 109, respectively, to develop an incremental production cost voltage on the resistors 108 and 109 for the stations STA1 and STA2, respectively. The voltages developed on the resistors 108 and 109 are applied over the now closed switch contact members 110 and 111, respectively, in the conductors 112 and 113, respectively, to the telemetering output transmitters 114 and 115, respectively. The telemetering transmitters produce signals on conductors 116 and 117 which are delivered to a summing point in the dispatcher's office to provide a control signal to the station similar to the system shown in the above mentioned patent, or may be delivered directly to the station for direct station control as desired.

It is pointed out that although the system lambda control potentiometer 26 is shown as a manually controlled potentiometer, this potentiometer value can be adjusted by automatic means such as shown in the previously mentioned patent.

Operation of the transmission cost computer under normal conditions will now be set forth. With the telemetering equipment 1, 38 and 70 establishing output voltages representative of the invidual station and the tie line outputs, the system lambda potentiometer 26 is adjusted to the system incremental delivered power cost, λ. Movement of the arm 25 of the potentiometer also adjusts the lambda repeating potentiometers 6 and 7, 44 and 45, and 73 and 74 for each of the two stations and tie line. This provides a voltage equal to the product of lambda and the power at each station or tie line which is applied to the transmission loss network matrix to produce a summed output current for each station that is algebraically added to a current proportional to the system lambda voltage. The summation current produces a voltage which produces a proportional signal which is transmitted to the desired station. The loss matrix is adjusted each time a transmission line is removed, added or changed and other loss matrix potentiometers and summing resistors can be added or subtracted as the system is enlarged or reduced.

During period of transmission cost computer breakdown or transmission cost computer operation for other purposes, an auxiliary computer system is provided for simulating approximate transmission loss incremental cost signals which when combined with the lambda delivered power cost signal give station production cost signals to the telemetering transmitters 114 and 115 for control of stations STA1 and STA2, respectively.

The auxiliary computer comprises two potentiometers 120 and 121. The actual incremental production cost voltages being delivered over the conductors 112 and 113 to control stations STA1 and STA2 can be directly read by the operator from the meters 118 and 119 respectively, capable of being selectively connected to the conductors 112 and 113 over the switches SW4 and SW5, respectively. The potentiometer 120 is connected to a suitable plus voltage source while the potentiometer 121 is connected to a suitable minus voltage source with the other ends of the potentiometers connected to a common ground terminal. The potentiometers 120 and 121 are provided with movable control arms or taps 122 and 123 respectively, suitably ganged to a manual drive 124 capable of moving the movable taps 122 and 123 between their extreme positions. These potentiometers perform the same function as potentiometer 26 and are controlled to be proportional to the same quantity: the cost of delivered power. The movable taps 122 and 123 have connected thereacross a pair of loss factor potentiometers 125 and 126 with the potentiometers connected in parallel. The movable tap 122 is then connected through the summing resistors 127 and 128 to the output conductors 129 and 130, respectively. The potentiometer 125 is provided with a movable tap 131 connected through a summing resistor 132 to the output conductor 130. The potentiometer 126 is provided with a movable tap 133 connected through a summing resistor 134 to the output conductor 129. The potentiometer 126 provides a voltage proportional to cost of delivered power. This voltage is multiplied by a constant loss factor which is determined by the position of the potentiometer arm 133. The modified voltage applied to summing resistor 134 produces a current through resistor 134 which represents transmission loss cost of station 1. Similarly, the potentiometer 125 produces a current through the summing resistor 132, which represents the transmission loss of station 2. The lambda voltage representing system lambda (delivered power cost) then causes currents to flow through the summing resistors 127 and 128 respectively. The summation of currents in resistors 132 and 128 flows through resistor 136 to produce a voltage on conductor 130 which is proportional to the station production cost for station STA2. Similarly, currents in resistors 134 and 127 flow through resistor 135 to produce a voltage on conductor 129 which is proportional to the station production cost for station STA1. The voltages developed by the resistors 135 and 136 are then connected to the output conductors 112 and 113, respectively, through the switch contacts 137 and 138, respectively. The incremental production costs of the auxiliary computer can then be read from the meters 139 and 140 for stations STA1 and STA2, respectively, with the value of the incremental production cost being established by the operator reading these two meters and adjusting the potentiometers 120, 123, 125 and 126 to a known or calculated incremental production cost value for each of the stations as indicated on the meters 139 and 140.

Since numerous changes may be made in the above described construction, and different embodiments of the invention may be made without departing from the spirit and scope thereof, it is intended that all matter contained in the foregoing description or shown in the accompanying drawing shall be interpreted as illustrative, and not in a limiting sense.

I claim as my invention:

1. A transmission loss computer for a plurality of network power stations and tie lines comprising a first input means for providing a pair of voltages for each station and power line representative of the power delivered to the system by each station and transfer of power by each tie line, manual means connected to said first input means to selectively supplement said station and tie line representative power voltage, a system lambda current developing means, lambda repeating variable means for each station and tie line connected to repeat said lambda voltage developing means, said lambda repeating means being connected to said input means to receive said representative station and tie line power voltages, transmission loss matrix means connected to said lambda repeating variable means, first summing means connected to said transmission loss matrix to provide an output control current for each station, a second summing means connected to said first summing means and said lambda current developing means for providing an output signal voltage in an output circuit for each station for establishing the proper bus bar cost of power for each station, controllable input means, and auxiliary transmission cost computer simulator means supplied from the controllable input means, a switching means, said switching means selectively connecting said auxiliary transmission cost computer to the output circuit for each station and disconnecting said second summing means from each said output circuit.

2. A transmission loss computer for a plurality of network power stations and tie lines comprising a first input means for providing a pair of voltages for each station and power line representative of the power delivered to the system by each station and transfer of power by each tie line, manual means connected to said first input means to selectively supplement said station and tie line representative power voltage, a system lambda current developing means, lambda repeating variable means for each station and tie line connected to repeat said lambda voltage developing means, said lambda repeating means being connected to said input means to receive said representative station and tie line power voltages, transmission loss matrix means connected to said lambda repeating variable means, first summing means connected to said transmission loss matrix to provide an output control current for each station, a second summing means connected to said first summing means and said lambda current developing means for providing an output signal voltage in an output circuit for each station for establishing the proper bus bar cost of power for each station, controllable input means, and auxiliary transmission cost computer simulator means supplied by said controllable input means, a switching means, said switching means selectively connecting said auxiliary transmission cost computer to the output circuit for each station and disconnecting said second summing means from each said output circuit, and station cost meter means selectively connected to said second summing means by said switching means.

3. A transmission loss computer for a plurality of network power stations and tie lines comprising a first input means for providing a pair of voltages for each station and power line representative of the power delivered to the system by each station and transfer of power by each tie line, manual means connected to said first input means to selectively supplement said station and tie line representative power voltage, a system lambda current developing means, lambda repeating variable means for each station and tie line connected to repeat said lambda voltage developing means, said lambda repeating means being connected to said input means to receive said representative station and tie line power voltages, transmission loss matrix means connected to said lambda repeating variable means, first summing means connected to said transmission loss matrix to provide an output control current for each station, a second summing means connected to said first summing means and said lambda current developing means for providing an output signal voltage in an output circuit for each station for establishing the proper bus bar cost of power for each station, controllable input means, and auxiliary transmission cost computer simulator means, energized from said controllable input means, a switching means, said switching means selectively connecting said auxiliary transmission cost computer to the output circuit for each station and disconnecting said second summing means from each said output circuit, said auxiliary transmission cost computer comprising a simulated lambda signal developing means, a simulated transmission loss signal developing circuit means and a fourth summing means for developing an output signal for each station.

4. A transmission loss computer for a plurality of network power stations and tie lines comprising a first input means for providing a pair of voltages for each station and power line representative of the power delivered to the system by each station and transfer of power by each tie line, manual means connected to said first input means to selectively supplement said station and tie line representative power voltages, a system lambda current developing means, lambda repeating variable means for each station and tie line connected to repeat said lambda voltage developing means, said lambda repeating means being connected to said input means to receive said representative station and tie line power voltages, transmission loss matrix means connected to said lambda repeating variable means, first summing means connected to said transmission loss matrix to provide an output control current for each station, a second summing means connected to said first summing means and said lambda current developing means for providing an output signal voltage in an output circuit for each station for establishing the proper bus bar cost of power for each station, said lambda current developing means comprising a potentiometer connected across a suitable source of power, said lambda repeater means comprising a pair of repeater potentiometers for each station and tie line connected to positive and negative power representative voltages for each station and tie line with one common end point of each potentiometer grounded.

5. A transmission loss computer for a plurality of network power stations and tie lines comprising a first input means for providing a pair of voltages for each station and power line representative of the power delivered to the system by each station and transfer of power by each tie line, manual means connected to said first input means to selectively supplement said station and tie line representative power voltages, a system lambda current developing means, lambda repeating variable means for each station and tie line connected to repeat said lambda voltage developing means, said lambda repeating means being connected to said input means to receive said representative station and tie line power voltages, transmission loss matrix means connected to said lambda repeating variable means, first summing means connected to said transmission loss matrix to provide an output control current for each station, a second summing means connected to said first summing means and said lambda current developing means for providing an output signal voltage in an output circuit for each station for establishing the proper bus bar cost of power for each station, said lambda current developing means comprising a potentiometer connected across a suitable source of power, said lambda repeater means comprising a pair of repeater potentiometers for each station and tie line connected to positive and negative power representative voltages for each station and tie line with one common end point of each potentiometer grounded, said repeater potentiometers and said lambda potentiometer comprising movable members mechanically ganged for simultaneous operation.

6. A transmission loss computer for a plurality of network power stations and tie lines comprising a first input means for providing a pair of voltages for each station and power line representative of the power delivered to the system by each station and transfer of power of each tie line, manual means connected to said first input means to selectively supplement said station and tie line representative power voltages, a system lambda current developing means, lambda repeating variable means for each station and tie line connected to repeat said lambda voltage developing means, said lambda repeating means being connected to said input means to receive said representative station and tie line power voltages, transmission loss matrix means connected to said lambda repeating variable means, first summing means connected to said transmission loss matrix to provide an output control current for each station, a second summing means connected to said first summing means and said lambda current developing means for providing an output signal voltage in an output circuit for each station for establishing the proper bus bar cost of power for each station, controllable input means and a third summing means energized from said controllable input means connected to said transmission loss matrix, meter means connected to said third summing means for indicating tie line cost of power transfer, said manual means comprising a resistance network for developing voltages for providing manual means supplemental voltages without affecting said first input means, said resistance network comprising a pair of resistances series connected and connected in parallel with said repeater means through a relatively low value series resistor forming a constant impedance to said first input means regardless of the current flow supplied from said manual means.

References Cited in the file of this patent

UNITED STATES PATENTS

| | | |
|---|---|---|
| 2,408,081 | Lovell et al. | Sept. 24, 1946 |
| 2,871,375 | Early | Jan. 27, 1959 |

OTHER REFERENCES

Electronic Analog Computers (Korn and Korn) page 11, 1952.